US012485424B2

(12) United States Patent
Ritleng et al.

(10) Patent No.: US 12,485,424 B2
(45) Date of Patent: Dec. 2, 2025

(54) BLADED GRINDER FOR PLASTER RECYCLING

(71) Applicant: HOLDING RITLENG, Rohr (FR)

(72) Inventors: Jean-Luc Ritleng, Rohr (FR); Geoffrey Ritleng, Rohr (FR); Arnaud Ritleng, Rohr (FR)

(73) Assignee: HOLDING RITLENG, Rohr (FR)

( * ) Notice: Subject to any disclaimer, the term of this patent is extended or adjusted under 35 U.S.C. 154(b) by 251 days.

(21) Appl. No.: 18/256,592

(22) PCT Filed: Dec. 29, 2021

(86) PCT No.: PCT/EP2021/087765
§ 371 (c)(1),
(2) Date: Jun. 8, 2023

(87) PCT Pub. No.: WO2022/144375
PCT Pub. Date: Jul. 7, 2022

(65) Prior Publication Data

US 2024/0033747 A1 Feb. 1, 2024

(30) Foreign Application Priority Data

Dec. 30, 2020 (FR) ....................................... 2014282

(51) Int. Cl.
*B02C 13/13* (2006.01)
*B02C 13/02* (2006.01)
(Continued)

(52) U.S. Cl.
CPC .............. *B02C 13/13* (2013.01); *B02C 13/02* (2013.01); *B02C 13/09* (2013.01); *B02C 19/0056* (2013.01)

(58) Field of Classification Search
CPC ......... B02C 13/13; B02C 13/02; B02C 13/09; B02C 19/0056; B02C 2013/2825
See application file for complete search history.

(56) References Cited

U.S. PATENT DOCUMENTS 3,018,972 A * 1/1962 Steinmetz ............... B02C 13/02
241/82
2012/0037733 A1 2/2012 Gitschel
(Continued)

FOREIGN PATENT DOCUMENTS

CN 205599253 U 9/2016
CN 108325674 A 7/2018
(Continued)

OTHER PUBLICATIONS

International Search Report dated Apr. 7, 2022 regarding International Application No. PCT/EP2021/087765.
(Continued)

*Primary Examiner* — Mohammed S. Alawadi

(57) ABSTRACT

Disclosed is a bladed grinder (20) for plaster waste, comprising a frame (10) comprising a support for a rotating shaft, comprising a main rotating shaft (30) comprising a plurality of vanes (40) radially attached on the main rotating shaft (30), comprising a system for rotating the main rotating shaft (30), comprising at least one inlet opening (60) for introducing waste comprising plaster, comprising at least one outlet opening for recovering large size waste, comprising, in the lower portion, openings covered with separation grids for filtering the defragmented gypsum, comprising a partially cylindrical cover which covers a continuous surface, characterised in that the cover is divided into at least two removable cover sections (50).

10 Claims, 6 Drawing Sheets

CROSS-SECTION B-B

(51) Int. Cl.

| | |
|---|---|
| ***B02C 13/09*** | (2006.01) |
| ***B02C 13/282*** | (2006.01) |
| ***B02C 19/00*** | (2006.01) |

(56) References Cited

U.S. PATENT DOCUMENTS

| | | | | |
|---|---|---|---|---|
| 2017/0305038 | A1 | 10/2017 | Paspek et al. | |
| 2020/0061631 | A1 | 2/2020 | Winter et al. | |
| 2021/0260595 | A1 * | 8/2021 | Chen | B02C 13/04 |

FOREIGN PATENT DOCUMENTS

| | | | | |
|---|---|---|---|---|
| EP | 1763407 | B1 | 3/2007 | |
| UA | 74814 | C2 | 2/2006 | |
| WO | WO9743043 | A1 | 11/1997 | |
| WO | WO2002087768 | A1 * | 7/2002 | B02C 13/095 |
| WO | WO02087768 | A1 | 11/2002 | |
| WO | WO2020013808 | A1 | 1/2020 | |

OTHER PUBLICATIONS

Informal Comments by Applicant on WO-ISA dated Jul. 7, 2022 regarding International Application No. PCT/EP2021/087765.

* cited by examiner

[Fig. 1]
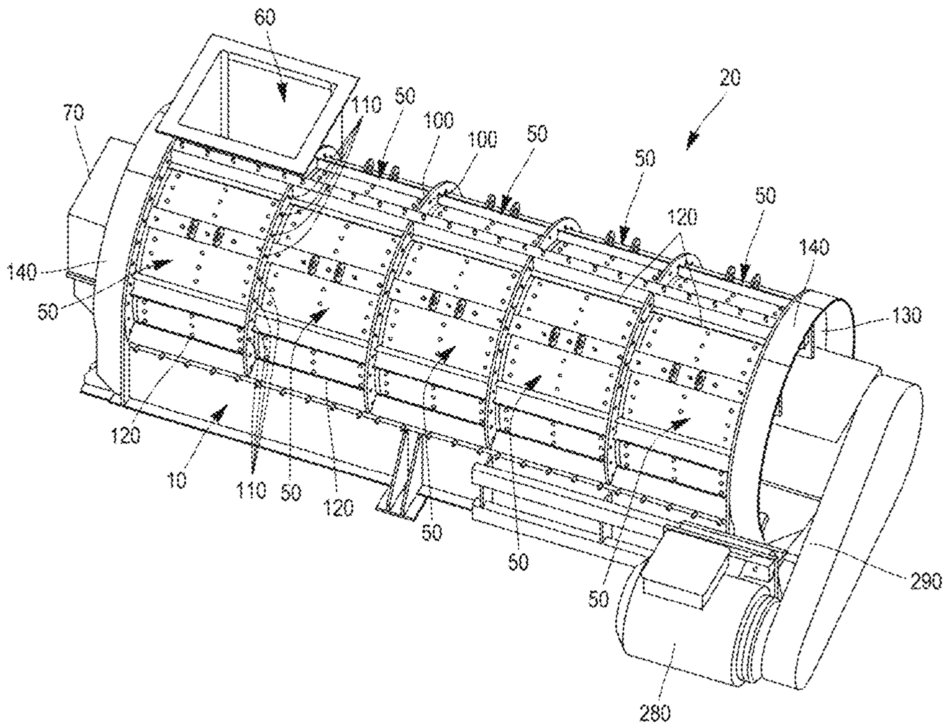

[Fig. 2]
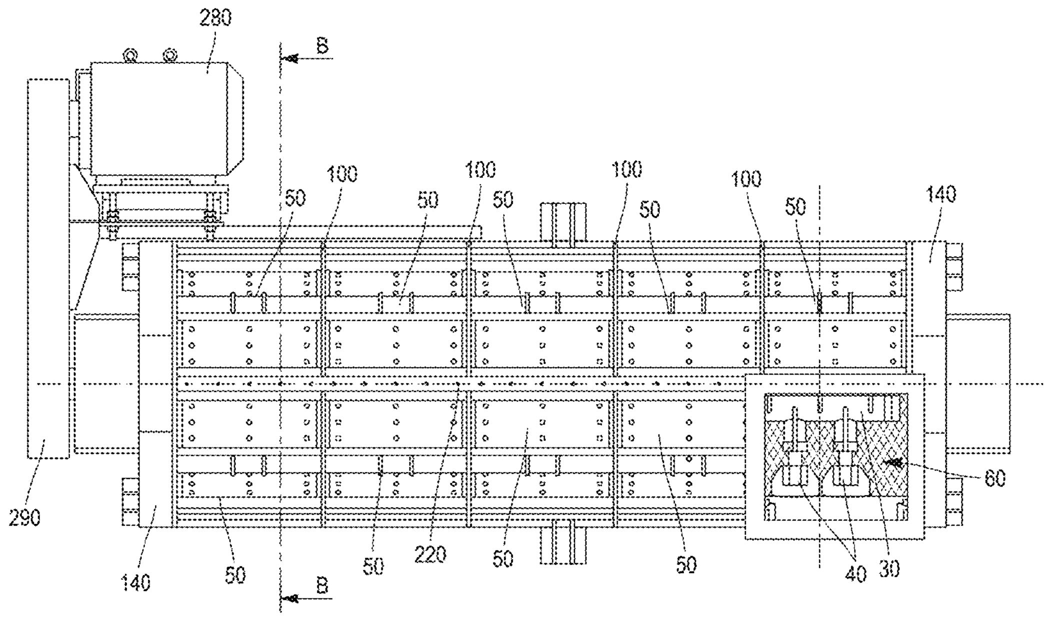

[Fig. 3]
CROSS-SECTION B-B
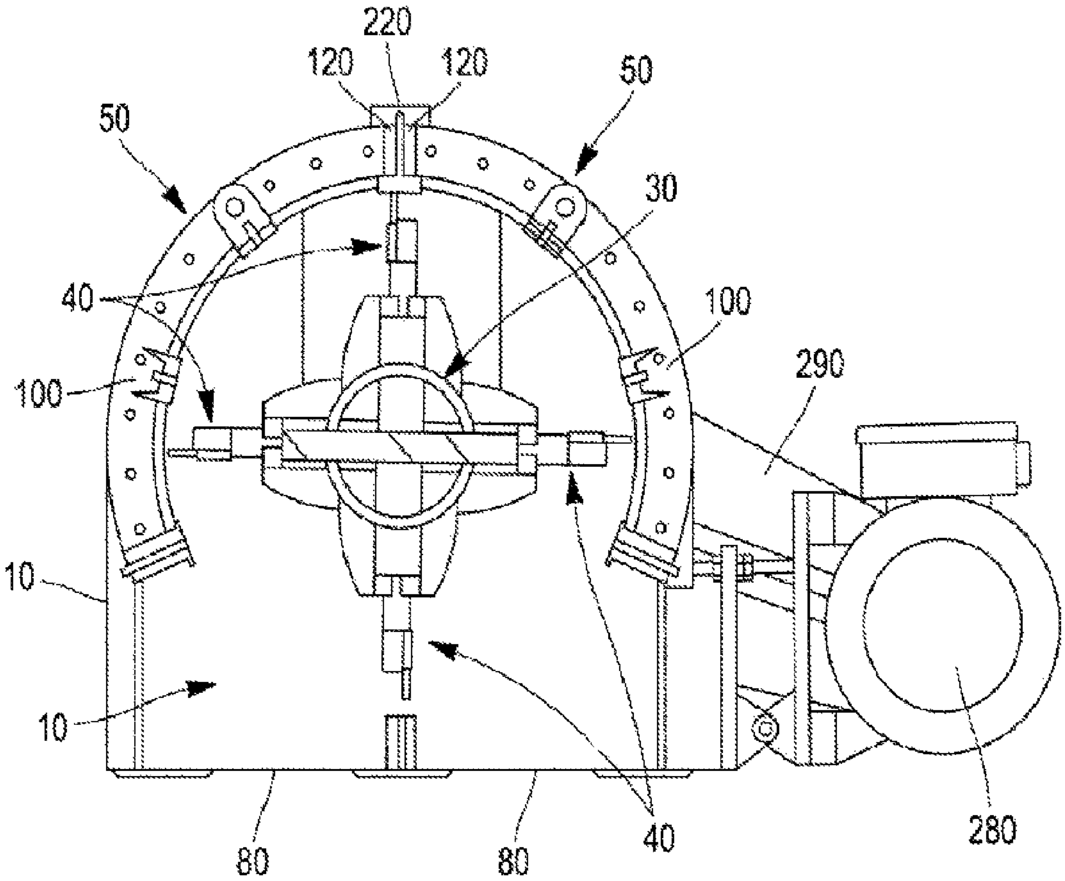

[Fig. 4]
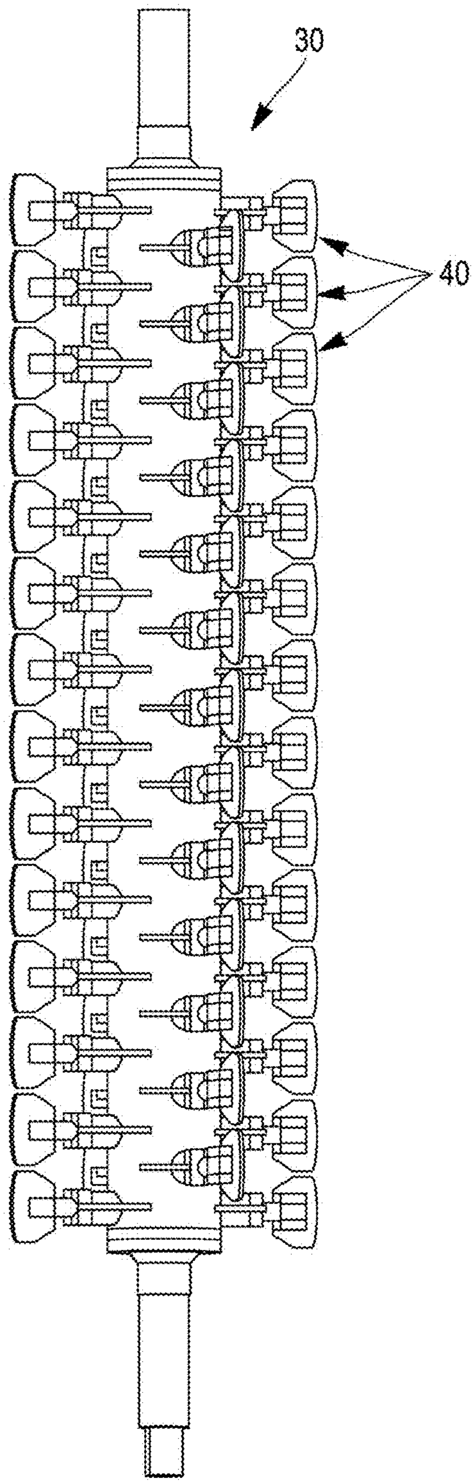

[Fig. 5]
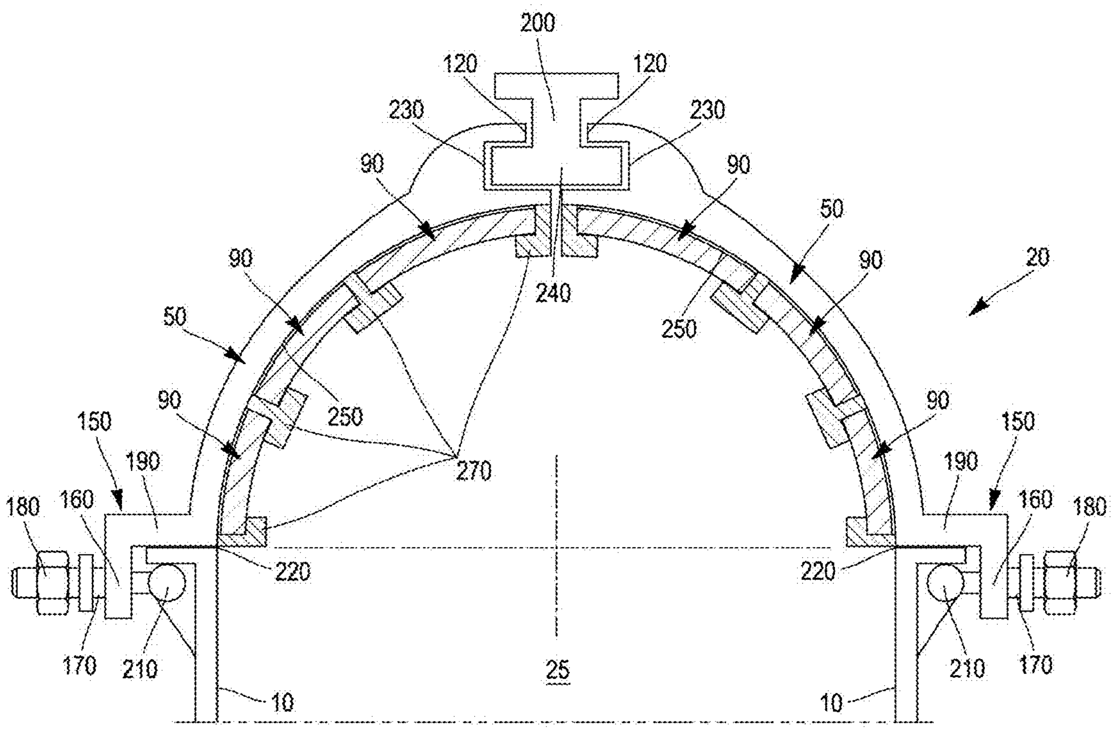

[Fig. 6]
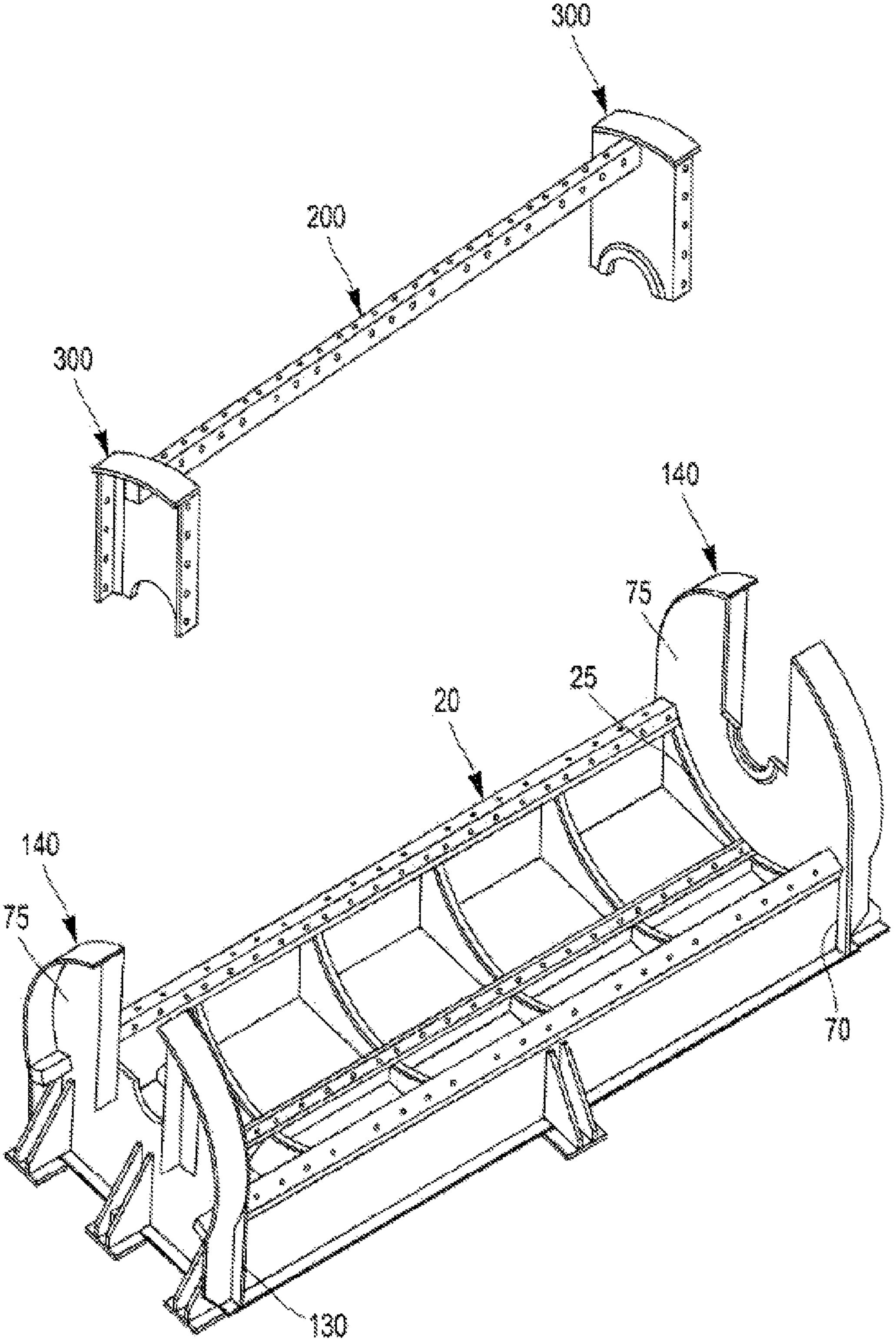

BLADED GRINDER FOR PLASTER RECYCLING

CROSS-REFERENCE TO RELATED APPLICATION

This application is a national stage application, filed under 35 U.S.C. § 371, of International Patent Application No. PCT/EP2021/087765, filed on Dec. 29, 2021, which claims the priority of French application No. 2014282, filed Dec. 30, 2020, the contents of which are incorporated by reference.

FIELD OF THE INVENTION

The present invention relates to the recycling of plaster used in the field of construction, as well as deconstruction or industrial applications.

More specifically, the invention relates to a grinder for plaster.

TECHNOLOGICAL BACKGROUND

In the field of recycling it is known to use a separation unit designed in the form of a grinder comprising hammers mounted on a horizontal rotary shaft and surrounded by a cylindrical surface equipped with apertures that forms an enclosed space into which the waste to be sorted is introduced on one side. Through the apertures on the other side, the heaviest particles are recovered in a first part close to the inlet, and the lightest particles at the opposite end to the inlet. In the first part, a hopper in the bottom part makes it possible to recover particles of a certain size. This type of unit is designed to unpack wrapped domestic waste.

The document US 2012037733 A1 is an example in which are presented systems and methods suitable for a use in the recycling and conversion of waste. More specifically, the document US 2012037733 relates to the recycling and upcycling of solid wastes originating, for example, from household and commercial waste.

Moreover, the known method comprises the use of a separation unit, which can be a hammer mill.

The bladed grinder separator comprises covers that can be hinge attached to provide access to the interior chamber for cleaning and/or troubleshooting problems.

However, plaster waste has different physical and mechanical characteristics. Thus, direct use of such a grinder is not suitable for processing construction or deconstruction wastes containing plaster. The structure is insufficiently robust, it becomes worn prematurely and requires maintenance that is too frequent and too complicated, which detracts from the productivity of the recycling.

In order to recycle plaster, i.e. to extract the gypsum therefrom in order to remake plaster, the known recycling grinders require too much maintenance to be cost-effective. In particular, the covers are subjected to significant physical stresses during the grinding and require maintenance that is too onerous and too frequent to remain cost-effective.

Thus, the invention aims to propose bladed grinders that are optimized for recycling plaster. Thus, the maintenance and the replacement of wearing parts will be facilitated and simplified so as to shorten the maintenance time.

SUMMARY OF THE INVENTION

Thus, the invention relates to a bladed grinder for plaster waste, comprising a frame comprising a rotation shaft support, comprising a main rotation shaft comprising a plurality of blades fastened radially on said main rotation shaft, comprising a system for rotating the main rotation shaft, comprising at least one inlet aperture for introducing waste comprising plaster, comprising at least one outlet aperture for recovering the large-size waste, comprising in the bottom part apertures covered with separation screens for filtering the defragmented gypsum, comprising a partially cylindrical cover covering a continuous surface, characterized in that the cover is divided into at least two removable cover sections.

By virtue of these arrangements, access to the interior of the grinder is facilitated.

The frame is for example made from reinforced steel, comprising two beams in the shape of a recumbent U, back-to-back and spaced apart, connected together by a welded structure of sheet metal having a thickness of 12 mm. Thus, the frame provides good rigidity. Said welded structure forms the cradle in the middle of which the rotation shaft is positioned.

The rotation shaft is composed for example of a tube of 323.9 mm diameter, with a thickness of 20 mm.

At the bottom of this cradle, calibrated screens made from reinforced steel are fastened, for example by means of connection strips. The calibration is a function of the size of the gypsum particles that it is desired to recycle.

The frame corresponds to the bottom part of the grinder, the cover to the top part of the grinder. The frame, a welded single piece structure, makes it possible to ensure the rigidity of the grinder as a whole.

The screens are calibrated depending on the size of the defragmented gypsum particles that it is sought to recover.

According to different aspects, it is possible to make provision for one and/or another of the characteristics hereinafter, alone or in combination.

According to an embodiment, the main rotation shaft is fastened by means of a locking key.

For that reason, it is possible to remove the rotation shaft by lifting and thus facilitate maintenance.

According to an embodiment, wearing parts having the same curvature as the cover sections cover the interior of each section of the cover and are fastened using a reversible fastening system.

Thus, the wearing parts are easy to replace. The wearing parts can be for example made from wear steels of the Creusabro® type, which is a registered trade mark well known to a person skilled in the art, or from low-carbon abrasion-resistant martensitic steels.

According to an embodiment, the reversible fastening system comprises connection strips bolted on the cover sections and positioned so as to sandwich certain edges of the wearing parts.

Thus, it is easy to remove only the wearing parts to be changed, and the fastening system is inexpensive. The edges of the wearing parts are held against the inner wall of the cover sections by virtue for example of perforated connection strips, which cover the edges of said wearing parts. Bolts spaced regularly apart and positioned in the holes of the connection strips are screwed into the cover sections so as to provide a reversible solid fastening of said wearing parts on the interior part of the cover sections.

According to an embodiment, the cover sections have a profile of an arc of circle, the top part of the cover sections is fastened by a keying means and/or the bottom part of the cover sections is fastened by a bolting means.

Thus, it is easy to assemble and disassemble one cover section or all of the cover sections depending on the maintenance action to be carried out. Once they are assembled, the sealing provided by the cover sections is excellent at all points.

According to an embodiment, the top part of the cover sections has a structure in the shape of a recumbent U, suitable for fitting into a beam in the shape of a recumbent H.

Such a beam with this shape is standard in industry, directly available. Machining the cover sections is a machining that is simple to carry out. The result provides an excellent sealing joint and also contributes to reinforcement of the cover structure. Its solidity is thereby reinforced at lower cost.

According to an embodiment, the top part of the cover sections fits directly into the beam in the shape of a recumbent H.

Thus, the separation of the plaster from its support is improved.

According to an embodiment, the rotation speed of the main rotation shaft is 350 rpm to 650 rpm.

Thus, the separation of the plaster from its support is further improved.

According to an embodiment, the set dimensions of the blades are dimensions of 204 mm width by 18 mm thickness, forming a rectangle, and with an angle of 0 à 30° with respect to the axis of rotation.

According to an embodiment, the frame (10) is a welded single-piece structure.

BRIEF DESCRIPTION OF THE DRAWINGS

Embodiments of the invention will be described hereinafter with reference to the drawings, briefly described below:

FIG. 1 shows a 3D view from above of a first embodiment of a grinder optimized for recycling plaster, in configuration of use.

FIG. 2 shows a top view of the first embodiment of a grinder optimized for recycling plaster, in configuration of use, indicating a cross section.

FIG. 3 shows the cross section view B-B of the first embodiment of a grinder optimized for recycling plaster, in configuration of use.

FIG. 4 shows a front view of the rotation shaft alone.

FIG. 5 shows a view along the same cross section as that in FIG. 3 of a second embodiment of a grinder optimized for recycling plaster, in configuration of use without the rotation shaft or the motor.

FIG. 6 shows a 3D exploded view of the frame only and of the locking keys fastened to the beam.

In the drawings, identical references denote identical or similar objects.

DETAILED DESCRIPTION

The invention relates to a grinder for plaster waste.

The detailed description as a whole relates to two specific example embodiments of the grinder for plaster waste. Of course, other embodiments exist for a person skilled in the art.

A rectangular frame 10, for example made from carbon steel, serves as support for all of the elements of the grinder 20 and of the cradle 25 in the middle of which is positioned a main rotation shaft 30 comprising a plurality of blades 40 fastened radially on said main rotation shaft 30.

The main rotation shaft 30 in configuration of use is only just visible. It is covered by removable cover sections 50 that sealingly cover the upper part of the frame from one axial end to the other, with the exception of the inlet aperture 60.

Sealing of the connection between the frame and the main rotation shaft 30 is provided by means of stuffing box sealing rings (not shown).

From above, as shown in FIG. 1, a first tangential inlet aperture 60 can be seen. Plaster waste to be processed can be introduced through this inlet aperture 60. Said first inlet aperture 60 is situated close to a first axial end 70 of the frame 10. Said inlet aperture 60 has for example a rectangular shape. The dimensions of the inlet aperture 60 can be 600 mm by 500 mm. Each axial end 70 of the frame 10 is sealingly closed by an end disk 75.

The structure of the inlet aperture 60 creates a tangential opening making it possible to introduce plaster waste into an essentially closed processing space of the grinder 20 for plaster waste.

Under the frame 10, outlet apertures 80 make it possible to collect the result of the action of the grinder 20. These outlet apertures 80 can be 8 in number. These outlet apertures 80 are covered with interchangeable separation screens (not shown) fastened to the frame 10. The size of the screens is slightly larger than the outlet apertures 80, thus allowing said separation screen edges to be fastened, for example by installing connection strips bolted to the frame 10.

On its top half, the main rotation shaft 30 and its blades 40 are completely covered by the removable cover sections 50. The removable cover sections 50 are subjected to severe mechanical stresses during grinding. The removable cover sections 50 are therefore manufactured for example from highly abrasion-resistant steel and the face thereof situated on the interior of the grinder is covered with wearing parts 90 made from a material highly resistant to wear through friction, for example wear steels, of the Creusabro® type, which is a registered trade mark well known to a person skilled in the art, or low-carbon abrasion-resistant martensitic steels.

The cover sections 50 also require regular maintenance, in particular replacement of the wearing parts 90 at regular intervals of time.

To respond to this double requirement, at the level of the cover sections 50, having a robustness once installed, and rapidity of disassembly when the wearing parts 90 must be replaced, a modular structure of the cover sections 50 is put in place that is particularly suitable for a plaster waste grinder.

Each cover section comprises a shaped metal plate, for example the base of which is a rectangle or square of metal curved in an arc of circle centred on the axis of the rotation shaft 30. The two curved edges of these cover sections 50 have a flange 100, raised at a right angle to the exterior side of the cover section 50, which is sufficiently wide to pierce holes and notches therein at regular intervals. The holes have a diameter sufficient to allow the passage of the threaded shanks of standard bolts, for example size M18. The notches make it possible to curve the rectangular piece without breaking the flange 100. The holes are positioned at the same interval and the same initial reference mark so as to pass a threaded shank through that is sufficiently long to pass through the thickness of two cover sections 50 and to tighten a nut on said threaded shank, thus fastening the cover section to the frame or to an adjacent cover section.

Thus, two cover sections 50 in place the curved flanges 100 of which are adjacent can be solidly attached to one another using a series of bolts 110 that remain easily accessible once the cover section is mounted on the grinder for plaster waste. It is thus also possible to mount cover sections 50 the rectilinear edges 120 of which are aligned. In addition, at the level of each of the upstream 70 and downstream 130 axial ends of the separator, the frame comprises at least one fixed collar 140 to which the adjacent cover section 50 is fastened by similar means.

At the level of the rectilinear edge 120 the closest to the floor of the cover section 50 the closest to the floor, the fastening is detailed in FIG. 5. In the other embodiment, the fastening system at the level of said rectilinear edge 120 the closest to the floor is not visible in FIG. 3, but it can be identical to that shown in FIG. 5. This system can be similar on each lateral side of the grinder for plaster waste, as shown in FIG. 5.

The rectilinear edge 120 the closest to the floor of the cover section 50 is folded once towards the interior of the curvature of the cover section, at 90° along a first strip 160 sufficiently wide to make it possible to pierce therein a series of holes sufficient to allow a threaded shank 170 to pass therethrough and to make it possible to screw an adapted nut 180 thereon. For example, the strip can measure 100 mm. A second curvature towards the exterior of the curvature of the cover section, at 900 along a second strip 190 sufficiently wide to make it possible to allow the passage, under the L-shaped structure thus formed, of a support for a threaded shank 170 mounted on a ball 210 positioned on an edge of the frame 220 that forms the cradle 25. Slots positioned on the first strip 160 facing the ball 210 connecting the threaded shank 170 to the frame 10 have a sufficient size to allow the threaded shank 210 to pass to the interior of said slots and a size not exceeding the size of the nut 180, making it possible to lock the cover sections against the edge of the frame.

Thus, with a threaded shank 210 sufficiently longer than the length necessary to screw the nut 180 onto the threaded shank 210 to lock the cover section 50 on the frame 10, it is possible to retain the nut 180 on the threaded shank 170 while removing the threaded shank 170 from the slot. By virtue of this system, the threaded shanks 170 and the nuts 180 are kept at the location where they must be reused to reassemble the cover section 50 once maintenance is finished.

Fastening each cover section 50 on the rectilinear edge 120 the furthest from the floor can be done by keying.

Two embodiments of this keying means are shown on the cross section views in FIGS. 3 and 5. In both cases, a standard central beam 200 in the shape of a recumbent H, as long as the sum of the rectilinear sides of the cover sections 50, is installed between two cover sections 50 that face one another.

In FIG. 3, the rectilinear flange 120 the furthest from the floor of each cover section is folded twice parallel to the edge at 90 degrees towards the exterior of the grinder 20, thus forming a recumbent U, the dimensions of which make it possible to intercalate the central beam 200 between the two rectilinear edges 120 the furthest from the floor of two cover sections 50 that face one another according to the cross section in FIG. 3.

In the embodiment shown in FIG. 5, the rectilinear edge 120 the furthest from the floor of each cover section is machined to form a jaw 230 that comes into position on the flange 240 the closest to the floor of the standard central beam 200 in the shape of a recumbent H. This central beam 200 has an effect on the consolidation of the grinder 20 and also acts as a rail that is fitted along one of the four sides of the cover sections 50, thus making it possible to dispense with bolting said side of the cover section 50.

According to an embodiment shown in FIG. 6, two locking keys 300 are fastened on each end of the central beam 200. Each locking key 300 has a shape suitable for vertical notches of the end disks 75 that terminate by an arc of circle centred on the central axis of each end disk 75. The end of the locking keys 300 intended to be positioned in the vertical notches of the end disks 75 have a hollow shape of an arc of circle of the same diameter as that at the base of the notches of the end disks. Once in place, the two semicircles of the notch of the end disk 75 and of the locking key 300 form an empty disk centred on the axis of the end disk 75 capable of accommodating the main rotation shaft 30. The central beam 200 has a suitable length to make it possible for the locking keys 300 to be fastened to each end disk 75. Thus, by fastening the locking keys 300 to the frame 20, the beam 200 is also solidly fastened in its position of use. At each upstream 70 and downstream 130 end of the frame 20, the collars 140 as well as the end disks 75 are notched in order to leave a vertical notch reaching the centre of the end disks 75. The base of the vertical notches is rounded and they are suitable for the size of the rotation shaft 30 so as to position the rotation shaft 30 directly in the position of use at the base of said vertical notches. The edges of the notches have flanges at 90° oriented towards the exterior of the frame, sufficiently large to be pierced with holes having a sufficient size to allow threaded bolt shanks to pass through, and not exceeding a size making it possible to lock the bolt nuts. Thus, the fastening of the locking keys 300 is easily accessible when it is necessary to remove the rotation shaft 30.

Each of these embodiments makes it possible for the top joint between the cover sections 50 to be sealed. Removing a cover section 50, once the bolts on the three sides are removed, is carried out by exerting a horizontal force in translation having a component directed towards the exterior of the grinder 20 for plaster waste. Handles (not shown) fastened on the exterior face of the cover sections 50 make it possible to handle the cover sections easily.

The cover sections 50 are reinforced over the whole of the incurved surface 250 that is situated in the interior of the space where the main rotation shaft 30 rotates. For example, the curved wearing parts 90 intended to be renewed when they are worn by the grinding, are positioned in adjacent fashion on each cover section 50 so as to cover most of the interior surface. The curvature of the wearing parts 90 is ideally identical to the curvature of the cover sections 50. Flat metal connection strips 270 that are sufficiently flexible to follow the curvature of the interior of the surface of the cover sections 50 comprise regularly spaced holes the size of which makes it possible to fasten bolts. The interior of the surface of the cover sections 50 is pierced with threaded holes facing holes in the flat metal connection strips 270 so as to make it possible to lock two adjacent sides of wearing parts 90 by means of flat metal connection strips 270.

The assembly thus constituted creates a reinforced enclosed space solidly fastened with a tubular cross sectional shape in which the blades 40 can turn so as to beat the plaster in order to detach it from its support and to reduce it to powder.

In FIG. 1, the motor 280 is situated for example close to one end 130 of the frame. The rotation shaft of the motor is parallel to the longitudinal side of the frame 10 and situated projecting from the end of the frame 130.

Still in FIG. 1, the axis of the main rotation shaft 30 projects from the same end of the frame 130. Thus, a transmission belt 290 can be stretched to couple the main rotation 30 and motor 280 shafts. When the motor 280 rotates, the transmission belt 290 connecting the rotation shafts makes it possible to transmit the rotation of the motor shaft 280 to the main rotation shaft 30 of the grinder 20 for plaster waste. When the motor 280 stops its rotational movement, the main rotation shaft 30 of the grinder for plaster waste also stops. On each of the shaft, rotation disks are positioned between the shaft and the belt 290. The size difference of the rotation disks makes it possible to select the torque between the motor 280 and the main rotation shaft 30 of the grinder 20. The assembly of the motor 280, the rotation disks, the belt 290, forms a system for rotating the main rotation shaft 30 of the grinder 20. The rotation speed most suitable for separation is 350 rpm to 650 rpm.

In an embodiment (not shown) a set of enclosed wrapped V-belts forms part of the system for rotating the main rotation shaft 30 of the grinder 20. Other types of transmission are possible.

The main rotation shaft 30 of the grinder 20 is partially visible in FIG. 2, through the inlet aperture 60. FIG. 4 shows the main rotation shaft 30 separated from the rest of the grinder 20 for plaster waste. A plurality of blades 40, for example 56 blades 40 made from carbon steel, are fastened on the main rotation shaft 30 with shear bolts for protection against foreign bodies.

The shape of the blades 40, the setting thereof, were the subject of numerous tests and adjustments in order to achieve optimization of the effect of separation of the plaster from its support. The most suitable blades have dimensions of 204 mm width by 18 mm thickness, forming a rectangle, and with an angle of 0 à 30° with respect to the axis of rotation. The orientation of the blades also makes it possible to move the waste to be processed along the main rotation shaft.

When the main rotation shaft 30 is in rotation and waste comprising plaster is introduced via the inlet opening 60, the blades 40 hit the plaster in order to detach it from the support and reduce it to powder. The light and non-friable cardboard is driven by the airflow towards an outlet for the rejects that is situated under the frame, close to the other, downstream, end 130 of the frame 10 (not shown).

The main rotary shaft 30 has for example a diameter comprised between 305 mm and 323.9 mm, a length of 3 048 mm, a thickness of 20 mm, is made from grade S.355 steel. The main rotation shaft 30 is supported for example by 155 mm dead-eye bearings (not shown).

In order to facilitate the use thereof, the grinder 20 for plaster waste is positioned on a support structure made from very high-strength steel (not shown) which is free-standing and comprises an access platform and steps allowing an operator access to the removable cover sections.

A hopper is positioned below the interchangeable separation screens, to which a hatch allows access for a maintenance technician.

Two systems collecting the result of the sorting are positioned below the grinder 20: one for collecting the gypsum, another for the other waste.

Use of the grinder 20 follows the following main steps:

once the frame is solidly secured to the floor, the rotation shaft 30 is positioned in the notches of the two end disks 70 of the frame 130, and connected to the motor 280, the beam 200 and the locking keys 300 are then installed, above this rotation shaft 30, the locking keys 300 slipped into the notches then bolted to the frame 130, Each cover section is slipped onto the beam and placed on the edge of the frame 130, A threaded shank 170 mounted on the ball 210 is passed into a slot provided for this purpose on the first strip 160 of the cover section 50, The cover section 50 is locked laterally by means of a nut 80 screwed onto the threaded shank 170, securing the cover section 50 to the frame 130, The cover section 50 is bolted through the holes along the edges of said cover section 50, the motor 280 is powered up: the rotation of the main rotation shaft 30 of the grinder 20 starts;

Once the optimal rotation speed, 350 to 650 rpm, of the main rotation shaft 30 stabilizes, waste comprising sorting rejects larger than 2.5 mm but smaller than 200 mm, containing plaster, are fed through the inlet aperture 60;

The blades 40 hit the waste, thus detaching the gypsum bonded to the paper cladding and making it flow in the interior of the grinder 20 for plaster waste;

A gypsum fraction comprised between 1.2 mm and 30 mm is collected in a recovery hopper below the separation screens.

For the maintenance of one or more cover sections 50, it is easy to unbolt and unscrew the nuts 180 screwed on the threaded shanks 170 mounted on the ball 210 in order to release a cover section 50.

This grinder 20 is intended to be incorporated in a larger industrial process for processing plaster waste.

The gypsum thus impacted will be reduced to powder and granules smaller than 30 mm, which will represent between 14 and 25 t/hour depending on the dimensioning of the installation in said industrial process. The gypsum-free papers as well as the other waste, such as polystyrenes, glass or rock wool used as linings and larger than 40 mm represent 5% of the weight recycled per hour. They are considered as ultimate waste in a recycling plant.

The invention is not limited to the embodiments presented and other embodiments will become clearly apparent to a person skilled in the art.

LIST OF REFERENCE SIGNS

10: frame
20: grinder
25: cradle
30: main rotation shaft
40: blades
50: cover section
60: inlet aperture
70: first end of the frame (upstream)
75: end disk
80: outlet aperture
90: wearing parts
100: flange
110: bolt
120: rectilinear edge
130: second end of the frame (downstream)
140: collar
150: threaded shank
160: first strip
170: threaded shank
180: nut
190: second strip
200: beam
205: support
210: ball
220: edge of the frame
230: jaw

240: flange closest to the floor of the central beam
250: incurved surface of a cover section
270: connection strips
280: motor
290: belt
300: locking key

The invention claimed is:

1. A bladed grinder (20) for plaster waste, comprising:

a frame (10) comprising a rotation shaft support for a main rotation shaft (30), the frame serving as a support for elements of the grinder;

a plurality of blades (40) fastened radially on said main rotation shaft (30);

a system for rotating the main rotation shaft (30); and at least one inlet aperture (60) for introducing waste comprising plaster, and at least one outlet aperture located in the frame for recovering waste, the at least one outlet aperture being covered with separation screens for filtering fragmented gypsum particles, wherein the frame is configured as a bottom part of the grinder; and the frame is covered by a partially cylindrical cover, wherein the cover is configured as a top part of the grinder which covers the main rotation shaft and is supported by the frame, and wherein the cover is divided into at least two removable cover sections (50) that are fastened to one another along rectilinear edges, and the at least two removable cover sections completely cover a top half of the main rotation shaft and the plurality of blades.

2. The grinder (20) for plaster waste according to claim 1, wherein the main rotation shaft (30) is fastened by means of a locking key.

3. The grinder (20) for plaster waste according to claim 1, wherein wearing parts (90) have a same curvature as the cover sections (50), and the wearing parts (90) are fastened to an interior (250) of each of the at least two removable cover sections (50) using a reversible fastening system.

4. The grinder (20) for plaster waste according to claim 3, wherein the reversible fastening system comprises connection strips (270) bolted on the interior (250) of each of the at least two removable cover sections (50) and positioned so as to sandwich edges of the wearing parts (90).

5. The grinder (20) for plaster waste according to claim 1, wherein each of the at least two removable cover sections (50) have a profile of an arc of circle, top parts of each of the at least two removable cover sections (50) are fastened by a keying means, and/or a bottom part of each of the at least two removable cover sections (50) is fastened by a bolting means.

6. The grinder (20) for plaster waste according to claim 5, wherein the top part of each of the at least two removable cover sections (50) has a structure in a shape of a recumbent U, suitable for fitting into a beam (200) in a shape of a recumbent H.

7. The grinder for plaster waste according to claim 6, wherein the top part of each of the at least two removable cover sections (50) is fitted directly into the beam (200) in the shape of a recumbent H.

8. The grinder (20) for plaster waste according to claim 1, wherein the rotation speed of the main rotation shaft (30) is 350 rpm to 650 rpm.

9. The grinder (20) for plaster waste according to claim 1, wherein the blades have a width of 204 mm, a thickness of 18 mm, a rectangle shape, and with an angle of 0 to 30° with respect to a rotation axis of the main rotation shaft.

10. The grinder (20) for plaster waste according to claim 1, wherein the frame (10) is a welded single-piece structure.

* * * * *